US012674358B2

(12) United States Patent
D'Acquisto

(10) Patent No.: US 12,674,358 B2
(45) Date of Patent: Jul. 7, 2026

(54) ONE PIECE CLIMBING STICK DESIGN

(71) Applicant: Andrae D'Acquisto, Bellevue, IA (US)

(72) Inventor: Andrae D'Acquisto, Bellevue, IA (US)

( * ) Notice: Subject to any disclaimer, the term of this patent is extended or adjusted under 35 U.S.C. 154(b) by 1292 days.

(21) Appl. No.: 16/974,301

(22) Filed: Dec. 19, 2020

(65) Prior Publication Data

US 2022/0195802 A1 Jun. 23, 2022

(51) Int. Cl.
*E06C 9/02* (2006.01)
*E06C 1/38* (2006.01)

(52) U.S. Cl.
CPC ................ *E06C 9/02* (2013.01); *E06C 1/381* (2013.01)

(58) Field of Classification Search
CPC ... E06C 9/02; E06C 1/381; E06C 1/26; E06C 1/525; E06C 7/08; E06C 1/34; E06C 1/10; A45B 7/00; A63B 27/00; A63B 29/08; A63B 2209/02; A06C 1/34; A01M 31/00; A01M 31/02
See application file for complete search history.

(56) References Cited

U.S. PATENT DOCUMENTS 4,535,871 A * 8/1985 Lapeyre .................. E06C 1/381 182/189
5,080,193 A * 1/1992 Woof ........................ E06C 7/08 182/178.3
5,752,580 A * 5/1998 Jenkins, Jr. ............... E06C 1/34 182/100
5,806,626 A * 9/1998 Jenkins, Jr. ............. E06C 7/081 182/189
5,816,362 A * 10/1998 Jenkins, Jr. ............. E06C 7/081 182/189
6,170,609 B1 * 1/2001 Dech ....................... E06C 1/381 182/189
6,547,035 B1 * 4/2003 D'Acquisto .............. E06C 1/34 182/100
7,163,083 B2 * 1/2007 Argoud ............... E04G 21/3261 248/237
7,434,662 B2 * 10/2008 McFall ................. A01M 31/02 182/187
8,006,803 B2 * 8/2011 Guering .................. E06C 1/381 182/95
8,439,162 B1 * 5/2013 Galloway ............... E06C 1/381 182/189
8,556,035 B1 * 10/2013 Kendall .................. E06C 1/381 182/189
9,409,055 B1 * 8/2016 Niemela ................ A63B 27/00
9,732,556 B2 * 8/2017 Priest ...................... E06C 1/381
10,301,873 B2 * 5/2019 Priest ...................... E06C 1/387
10,582,704 B2 * 3/2020 Wheelington ........ A01M 31/02
10,798,937 B2 * 10/2020 Berry .................... A01M 31/02
10,973,224 B2 * 4/2021 Infalt .................... A01M 31/02
D943,117 S * 2/2022 D'Acquisto .................. D25/69
2005/0230186 A1 * 10/2005 Bigard .................... E06C 1/381 182/100

(Continued)

*Primary Examiner* — Brian D Mattei
*Assistant Examiner* — Kathleen M. McFarland

(57) ABSTRACT

The present invention generally relates to a one-piece climbing sticks for use in climbing trees for hunting or other purposes. The climbing sticks of the invention are characterized by a double step, one-piece design wherein the center support structure and the double steps emanating therefrom are fabricated from a single sheet or piece of aluminum and/or aluminum alloy.

17 Claims, 7 Drawing Sheets

(56) References Cited

U.S. PATENT DOCUMENTS

| | | | | |
|---|---|---|---|---|
| 2011/0114416 | A1* | 5/2011 | Mayhew | A01M 31/02 182/107 |
| 2012/0125715 | A1* | 5/2012 | Furseth | E06C 7/081 72/253.1 |
| 2014/0311828 | A1* | 10/2014 | Bassett | E06C 7/00 182/124 |
| 2014/0311829 | A1* | 10/2014 | Priest | A01M 31/02 182/187 |
| 2016/0265276 | A1* | 9/2016 | Hartman | E06C 7/48 |
| 2018/0073298 | A1* | 3/2018 | Hand | E06C 1/381 |
| 2019/0055782 | A1* | 2/2019 | Infalt | B23P 13/02 |
| 2020/0253190 | A1* | 8/2020 | D'Acquisto | A01M 31/02 |
| 2021/0023404 | A1* | 1/2021 | Erwin | E06C 1/36 |
| 2021/0205667 | A1* | 7/2021 | Garis | E06C 1/34 |
| 2021/0219540 | A1* | 7/2021 | Schmidt | E06C 1/381 |
| 2022/0025702 | A1* | 1/2022 | Hebert | E06C 7/082 |

* cited by examiner

ONE PIECE CLIMBING STICK DESIGN

FIELD OF THE INVENTION

The present invention generally relates to one piece climbing sticks, also referred to as ladder modules, for use in climbing trees for hunting or other purposes. The climbing sticks of the invention are characterized by a double step, one-piece design wherein the center support structure and the double steps emanating therefrom are fabricated from a single sheet or piece of aluminum and/or aluminum alloy.

BACKGROUND OF THE INVENTION

The invention relates to one-piece climbing sticks, also referred to as ladder modules, designed for use in climbing trees for hunting. Climbing sticks are available in an extremely wide variety of types, providing a myriad of sizes, shapes, materials of construction, mounting mechanisms and other features. Key among the important features to be considered by a hunter in choosing climbing sticks are safety, weight, simplicity of construction and use, and camouflage or capability of masking the construction from hunted game. The considerations of safety and weight are often conflicting because adequate strength frequently requires the use of heavier and stronger structural members. Lightweight structural materials are, therefore, used almost exclusively in the construction of climbing sticks. To balance the considerations of strength, weight and cost, structural aluminum has been the material of choice. As a result, the majority of climbing sticks on the market today utilize some type of tubular aluminum or steel.

Prior art climbing sticks are typically fabricated from a plurality of components using a variety of fastening techniques, including welding, rivets, screws and bolts. The use of mechanical fasteners in the fabrication of climbing sticks creates joints which inherently are not completely rigid and as a result may move and squeak or create other noises. Skilled hunters are extremely sensitive to any equipment that is unnecessarily noisy. Fasteners and fastener joints also present the potential for catching clothing or the like which is both annoying and potentially dangerous.

Despite the extremely wide variety of climbing sticks disclosed in the prior art and on the market today, all are subject to the same problems and deficiencies in construction, weight, strength, operation and use described above. It would be most desirable, therefore, to have a climbing stick of simple construction that does not require welded or cast fabrication or the use of fasteners, and yet is strong, quiet and light weight. In addition, it is also desirable that the climbing stick not present a noticeable geometric pattern to approaching game.

SUMMARY OF THE INVENTION

The present invention relates to one piece climbing sticks for climbing trees for hunting purposes. The climbing sticks of the invention are characterized by a double step, one-piece design wherein the center support structure and the double steps emanating therefrom are fabricated from a single sheet or piece of aluminum and/or aluminum alloy.

DETAILED DESCRIPTION OF THE INVENTION

The invention relates to improved climbing sticks for use in climbing trees for hunting or other purposes. The climbing sticks of the invention are solid metal and comprise a center support member or structure having double steps emanating therefrom fabricated from a single sheet of aluminum, aluminum alloy, or and similarly strong, lightweight material. By "one piece" it is meant that center support structure and double steps emanating therefrom are fabricated from a single sheet of stock without the use of welds, rivets, screws, bolts and the like. The use of mechanical fasteners in the fabrication of climbing sticks creates joints which inherently are not completely rigid and as a result may move and squeak or create other noises. The one piece climbing sticks of the invention overcome the deficiencies of the prior art by avoiding welds or any other fastening methods resulting in a stronger, lighter, quieter climbing stick.

The individual climbing sticks of the invention are solid and they are of superior strength as they are one piece. The sticks can have one or more unitary or double steps that are perpendicular or substantially perpendicular with the center support structure.

Each climbing stick is secured to the tree trunk by a securing belt attached at one end by a bolt to one side of the support member. The belt is releasably secured at its opposite end to a belt hook or fastener attached to the center support member opposite the belt.

The climbing sticks of the invention are, when necessary, strengthened by heat treatment or other strengthening methods when necessary in order to strengthen the metal and increase the strength thereof. Various other methods of strengthening the metal of the climbing steps of the invention are also included within the scope of this invention.

Figure 1:
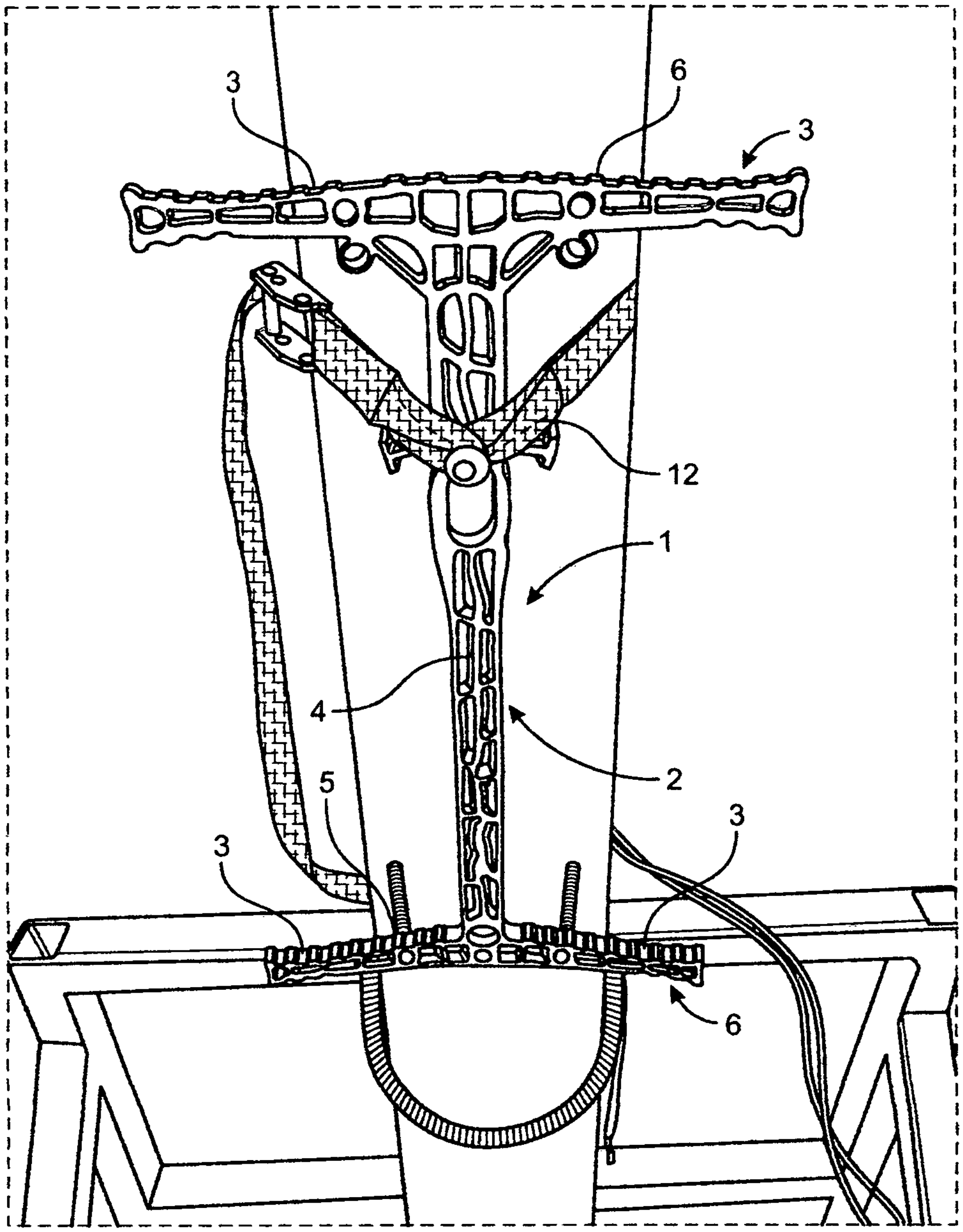
FIG. 1 is a frontal view illustrating the climbing stick of the present invention.

In one embodiment, the sticks of the invention are of a double step design. By double step it is meant that the left and right steps are generally perpendicular to and in the same plane as the center support structure. This double step design is illustrated in FIG. 1. The double steps of the invention also optionally comprise foot grips cut into the left and right stepping sections of the double steps allowing for a non-slip stepping surface for the user when climbing. The double steps can also be angled slightly upwards from the horizontal in order to prevent the users foot from sliding off the step when climbing. In one embodiment, the double steps are perpendicular with the center support structure. In another embodiment the double steps are angled from about 1 to about 20 degrees from the horizontal plane; in another embodiment from about 5 to about 20 degrees and in yet another embodiment from 10-15 degrees from the horizontal plane.

Figure 2:
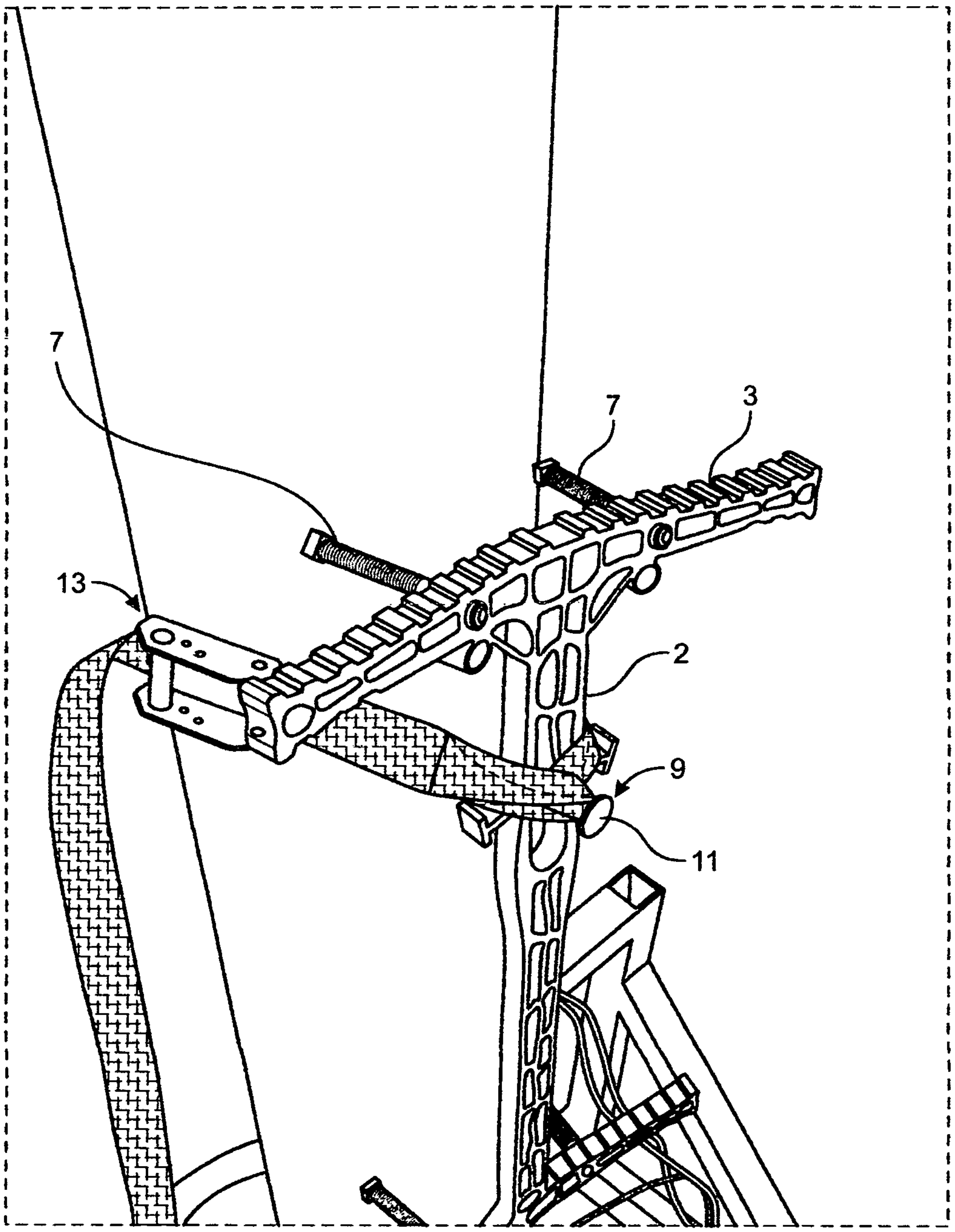
FIG. 2 is an offset view of the sticks of the invention.
Figure 3:
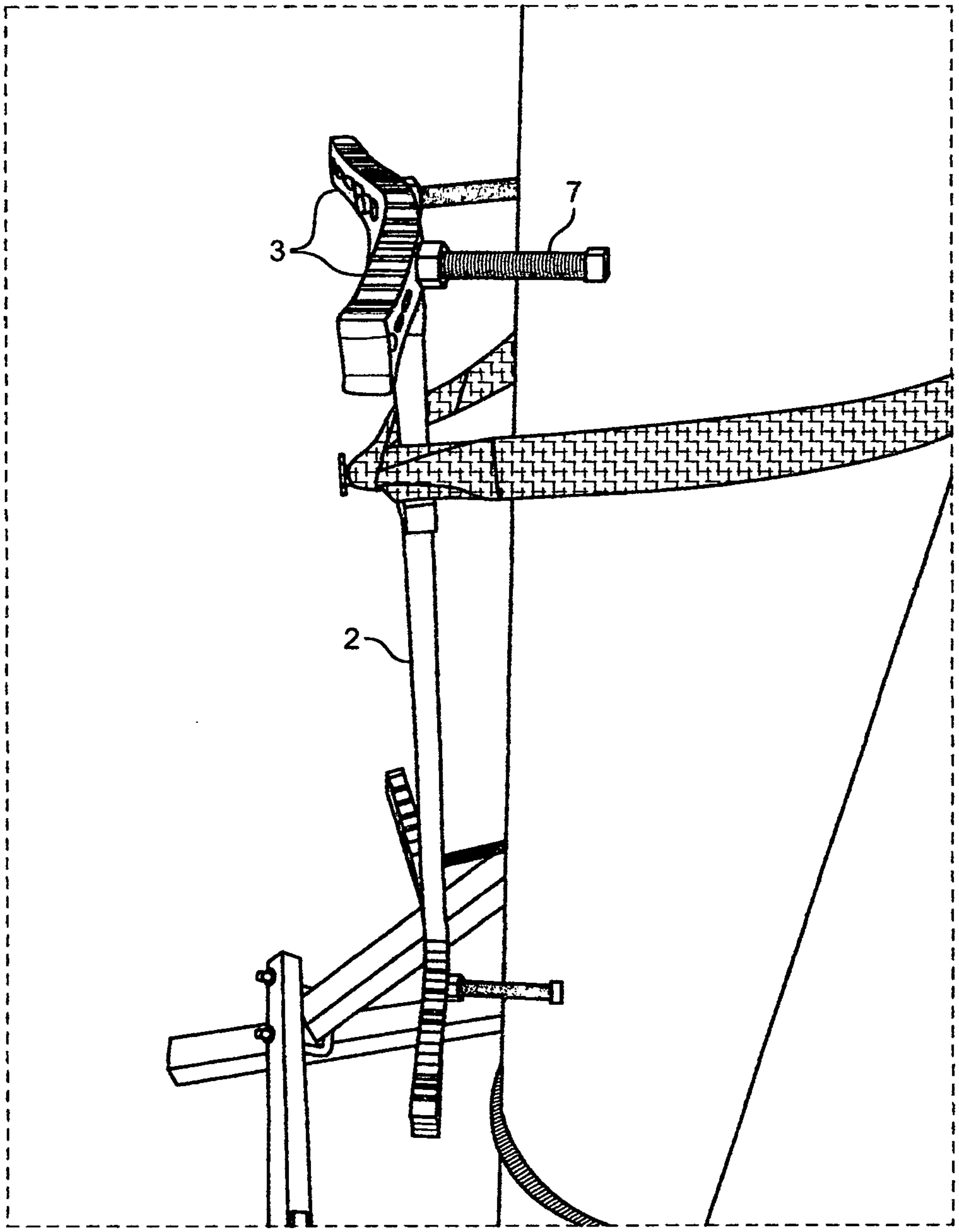
FIG. 3 is a side view of the sticks of the invention.
Figure 4:
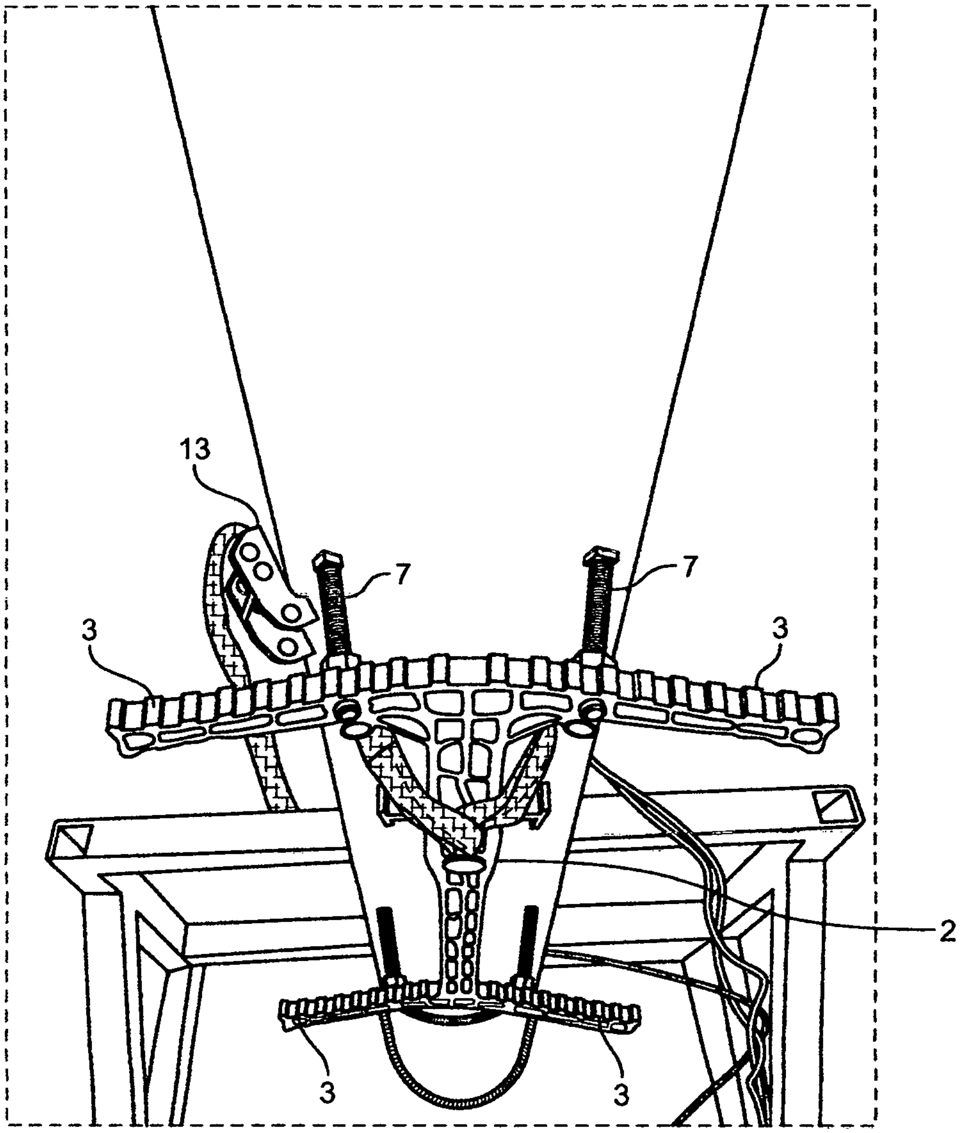
FIG. 4 shows a top view of the climbing sticks of the invention attached to a tree.

The climbing sticks of the invention also preferably comprise two or more support bolts or similar support structures mounted to the uppermost double step, wherein one support bolt is mounted to the left stepping portion of said double step and a second support bolt is mounted to the right stepping portion of the double steps as illustrated by FIG. 2. In another embodiment, the sticks of the invention comprise two support bolts mounted on the left and right stepping portions of both the uppermost double step and the bottom double step of said climbing stick. The support bolts engage and grip the tree on which the stick is placed to prevent the stick from slipping up or down or side to side on the tree. In one embodiment, the support bolts are adjustable, i.e., they can be lengthened or shortened depending on the needs of the user and the distance that the user wants the sticks to be secured away from the tree. The support bolts can be straight or can be angled in order to maximize grip on the tree. In one embodiment, the support bolts are angled 1-30 degrees, in another embodiment 1-25 degrees, in another embodiment 3-20 degrees and in another embodiment 5-15 degrees from the vertical plane of the center support structure.

In another embodiment, each stick also comprises receiving ports or holes configured to receive the two or more support bolts of a companion stick, which allows one to securely nest and attach two or more sticks to each other snugly for transport. These receiving ports or holes are preferably located at pre-determined locations proximate to the top and/or bottom double steps of the climbing stick. In another embodiment, each stick comprises a receiving port configured to receive the Versa button of another stick such that two or more sticks can be securely nested one to the other.

Figure 7:
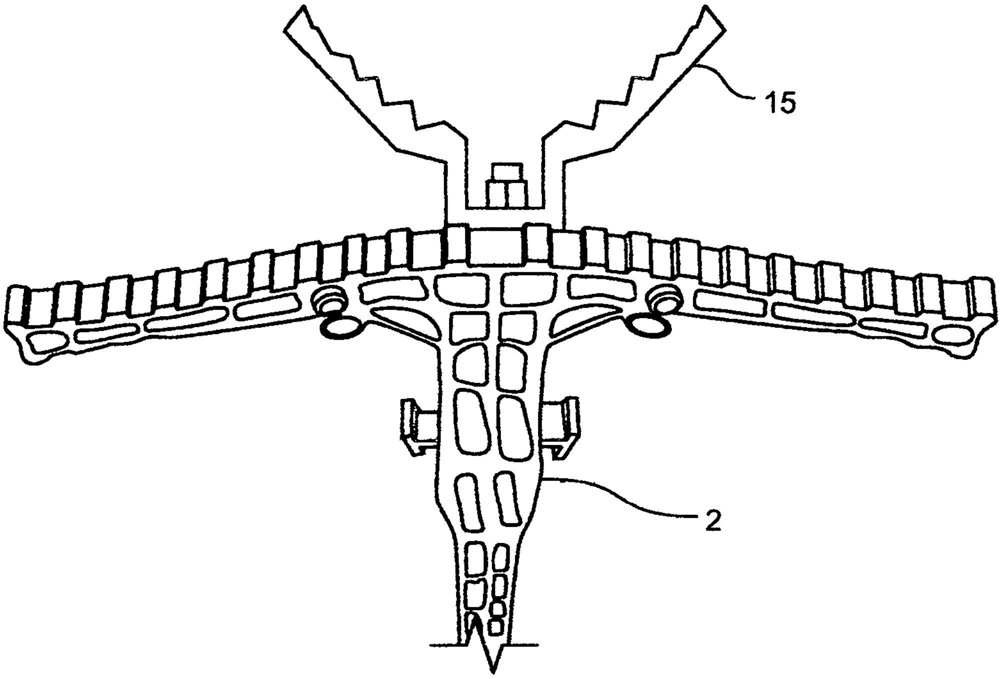
FIG. 7 shows the support bracket mounted to the center support structure of the climbing stick of the invention.

In another embodiment, the sticks of the invention also comprise one or more support brackets instead of support bolts, wherein said brackets are mounted to the center support member as shown in FIG. 7. The brackets are generally V-shaped and include a number of teeth on the interior surface of the bracket adapted to engage the tree on which the stick is placed in order to prevent the climbing stick from slipping from the tree. The support brackets are mounted at the top and optionally the bottom end of the support member. The brackets also pivot allowing them to become flush with the body of the stick to minimize profile when stacking the sticks for transport or attachment to a treestand: More specifically, the brackets that grip the tree when climbing and pivot 180°, in another embodiment 360° allowing them to become flush with the body of the stick to minimize the profile thereof and allow two or more sticks to nest closely together so that they can be easily carried/secured to a treestand. The pivoting feature of the support bracket of the invention is applicable to any climbing stick design and is not limited to the preferred embodiments or sticks described herein.

Finally, the climbing sticks are characterized by having an irregular geometric pattern machined or jetted out of the support member and/or steps. Skilled hunters are aware that ordered structural patterns are generally an anomaly in the wild and, when seen by hunted animals, may keep them from approaching or cause them to flee.

The climbing step of the invention comprises a securing arrangement used to secure the climbing stick to a tree. The arrangement includes a belt fastener disposed on the support member between the upper double step and the lower double step. In one embodiment, the fastener is comprised of a stem extending outwardly from the support member and a radially extending flange attached to the stem opposite the support member that covers the stem. The flange, or Versabutton™ provides an attachment point for a belt forming the remaining portion of the improved securing arrangement utilized with the climbing stick. The belt is comprised of a pair of straps, each including a loop at one end. The loops on each strap are placed over the flange of the fastener to secure the loops to the fastener on the support member. One of the straps includes an adjustable buckle attached to the strap opposite the loop that engages the non-loop end of the remaining strap to releasably secure the belt about the trunk of the tree. The loop and fastener arrangement of the present invention allows the securing belt to be secured about the tree trunk with the buckle positioned on either side of the support member, so that the buckle may be selectively positioned to avoid any limbs, branches or other obstructions that may prevent the securing belt from performing properly. The securing strap is an elongate strap of a durable material, such as nylon, that includes a free end and a loop integrally formed in the strap opposite the free end. The securing strap is removably attached to the fastener by placing the loop around the retaining flange of fastener. The flange prevents the loop from disengaging from the fastener, maintaining the securing strap in attachment, with the center support structure.

This securing arrangement is also able to be used on other devices utilized by hunters that are secured to a tree, such as tree stands. The configuration of the securing arrangement allows the belt to be selectively and releasably positioned on the support member to avoid any interference with the belt by limbs or branches extending from the tree. The strap for attachment to the tree comes through the stick from back to front allowing you the option of going around the tree in either direction opposed to the strap coming out of one side. The belt is comprised of a securing strap, a buckle strap, and a releasable buckle.

Figure 5:
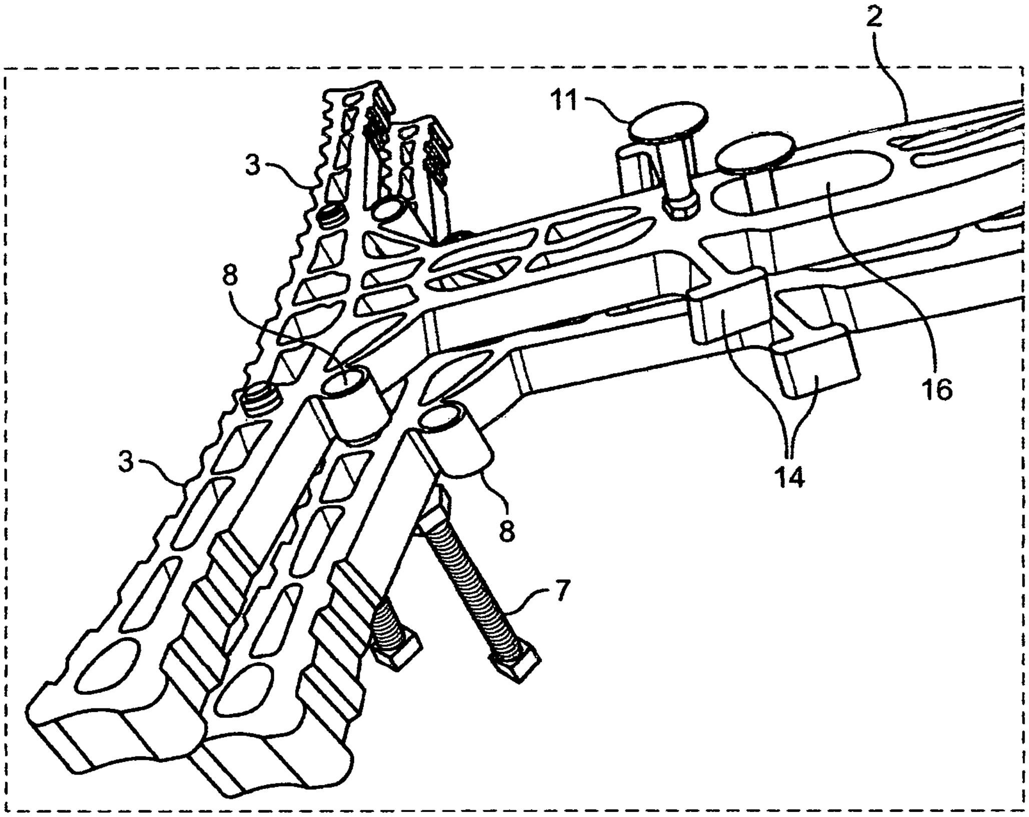
FIG. 5 shows how the sticks of the invention nest together.

As an alternative to the flange Versabutton™ design, the climbing stick of the invention can have attachment anchor fabricated as part of the one-piece design for streamline attachment, as illustrated by FIG. 5. The attachment anchor serves as a wedge for rope attachment opposed to dual cam mechanisms. Other releasable securing arrangements can be utilized instead of belts, including chains, cables, ropes and the like.

The support member of the sticks optionally comprise hand grips cut right into the support member allowing for better grip when climbing. In one embodiment, the support member is not straight it jogs for added concealment and profile break up when in tree. Patterns and true edges are very unnatural in nature. The cutout designs cut out of support member of the sticks of the invention have no consecutive pattern to better blend in the wilderness.

In its broadest embodiment, the one piece climbing stick of the invention can be made of by any process, including machining from a solid metal workpiece such as aluminum or aluminum alloy and the like, and/or by a cast aluminum process. Any form of aluminum, aluminum alloy, or other metal/metal alloy can be used to fabricate the climbing stick of the invention provided that it is of sufficient strength and not excessively heavy.

One option to obtain a lighter climbing stick is to use a support structure machined from one-piece plate stock. This machining process solid allows one to fabricate solid center support structures and steps in one piece from a single piece of aluminum stock which is much lighter and stronger conventional sticks.

In another embodiment of the one piece climbing stick of the invention is fabricated from a single aluminum workpiece by a waterjet process, optionally an abrasive waterjet process. Fabricating a solid one-piece center support structure with an abrasive water jet process allows one to make one piece sticks that are even stronger and lighter than structures machined from one piece of plate stock. Utilizing a waterjet process allows one to reduce the wall thicknesses and still achieve the strength needed. Accordingly, the solid one piece climbing sticks of the invention made by waterjet process are among the strongest and lightest in the industry. Additionally, they are quieter and stealthier than prior art support structures that are generally of hollow tubular design. Water jet cutting uses an ultra-high-pressure stream of water to carry an abrasive grit. The abrasive does the cutting through a mechanical sawing action, leaving a smooth, precision cut surface. Waterjet is the most versatile process, because it is able to cut almost any type of material, including aluminum. Water jet is a very precise cutting process. It has a narrow kerf width, allowing fine contours to be cut, and producing high tolerance parts. The effect is to produce the parts you need for substantially lower cost, in substantially less time.

The water jet cutting process starts with an intensifier pump, which creates the ultra-high pressure (up to 90,000 psi) water pressure required for cutting hard materials. The Intensifier pump uses a hydraulic pressure over water system. A large horsepower motor drives a hydraulic pump, creating hydraulic pressure which powers a piston in a cylinder. The pressurized water is delivered to a cutting head by either high pressure tubing or hose. At the cutting head, the high pressure water is applied to an orifice with a typical diameter ranging from 0.005" to 0.020". This orifice is made in a diamond or sapphire, to resist abrasion of the high-pressure water. The orifice defines and creates the water stream which cuts through the material.

After the water stream exits the orifice, an abrasive can be added to the water stream, to allow it to cut hard materials. When cutting hard materials, including steel, stainless steel, aluminum, stone, wood, plastic, glass, etc., it is the abrasive that does the actual cutting using a mechanical sawing type action. The abrasive is usually crushed garnet, the same type of material often used as the abrasive on sand paper. Some special applications utilize other abrasive types.

The strength increase provided by a solid unitary aluminum construction by waterjet process allows a reduction in size and weight of the climbing stick of the invention. The solid construction also reduces the transmission of noise more common in constructions utilizing hollow tubular center structural members.

Finally, the entire outer surface of the climbing stick of the invention can be anodized with an irregular contrasting pattern to further enhance its camouflage appearance.

DETAILED DESCRIPTION OF THE INVENTION

FIGS. 1-7 illustrate the climbing stick 1 of the invention. Referring to FIG. 1, the climbing stick 1 includes a solid elongate center support structure 2 that functions as the body of module 1 and two double steps emanating therefrom 3 of one-piece design. The support member 2 optionally comprises hand grips cut right into the support member allowing for better grip when climbing. In one embodiment, the support member is not straight, it jogs for added concealment and profile break up when in tree. Patterns and true edges are very unnatural in nature. The cutout designs 4 cut out of support member of the sticks of the invention have no consecutive pattern to better blend in the wilderness. The cutout pattern 4 is best shown in FIG. 1.

Support member 1 includes two double steps 3 to provide a left and right stepping surface for an individual using the ladder module 1. The sticks of the invention can be lengthened to include three or more double steps if desired. The stepping portion of the double steps optionally include a number of grooves or gripping cutouts 5 spaced along its length. The grooves provide traction for the foot of the individual utilizing the step 1 to help prevent the foot from slipping off the stepping portion of the step 6.

The double steps 3 provide a horizontal stepping surface on both sides of the center support member 2. Alternatively, the stepping surface can be slightly angled upward from the horizontal as a further preventative measure against slippage.

Figure 6:
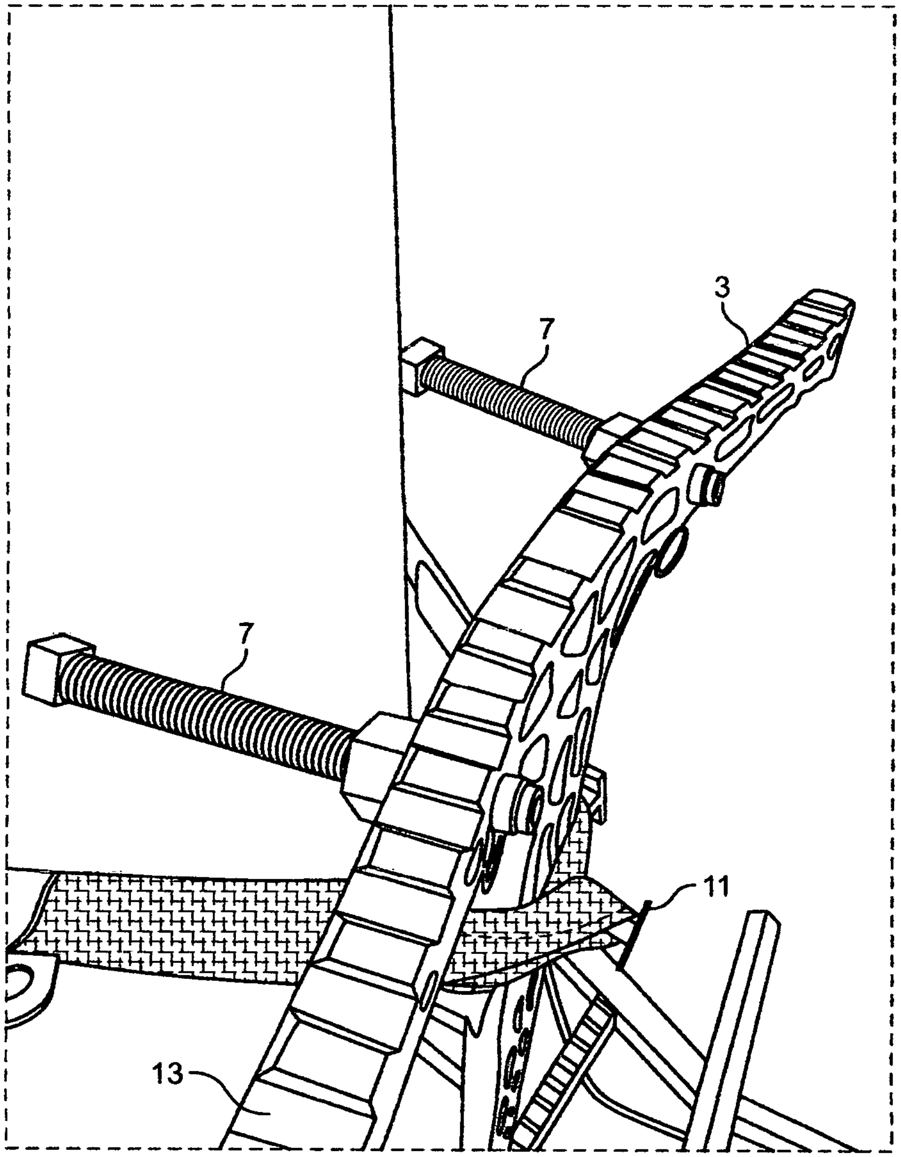
FIG. 6 shows how the support bolts of the invention engage the tree.

In one embodiment, the climbing sticks of the invention comprise two or more support bolts 7 mounted to the left and right side of the double steps 3, which are best illustrated by FIGS. 2 and 6. In one embodiment, the sticks of the invention comprise two support bolts 7 mounted on the left and right side of the top double step 3. In another embodiment, the sticks of the invention comprise two support bolts 7 mounted on the left and right side of both the top and bottom double step 3. The support bolts 7 engage and grip the tree on which the stick is placed to prevent the stick from slipping up or down or side to side on the tree. The support bolts can be straight or can be angled in order to maximize grip on the tree. In one embodiment, the support bolts are angled 1-30 degrees from the horizontal or vertical plane.

In another embodiment, each stick also comprises receiving ports or holes 8 configured to receive the support bolts 7 of another stick, which allows one to securely nest and attach two or more sticks to each other snugly for transport. These receiving ports or holes 8 are preferably located at pre-determined locations proximate to the top and/or bottom double steps 3 of the climbing stick 1. In another embodiment, each stick comprises a receiving port configured to receive the Versa button 16 of another stick as shown in FIG. 5 such that two or more sticks can be securely nested one to the other.

In an alternative embodiment and as shown if FIG. 7, the center support structure 2 includes a pair of support brackets 15 mounted adjacent the top end and bottom end of the support structure 2. The brackets are generally V-shaped, including an interior surface and an exterior surface and are the rotatably mounted to each end of the support member to allow each bracket to independently conform to the direction in which the tree trunk extends. The brackets that grip the tree when climbing pivot allowing them to become flush with the body of the stick to minimize profile and to allow the sticks to nest closely together so that they can be easily carried/secured to the treestand of the invention. In one embodiment the brackets pivot 180°, and in another embodiment, they pivot 360° to allow said brackets to rest flush with the body or center support structure of the sticks.

The brackets optionally include a number of teeth spaced along the length of each side of bracket that are generally triangular in shape having a point extending outwardly from the interior surface of bracket. The teeth on bracket engage the trunk of the tree to prevent the module 1 from sliding down the tree when a person is climbing a tree.

Referring now to FIG. 2, the support member 2 also has a securing arrangement to hold the climbing stick 1 on the tree. A fastener 10 is secured to the support member 2 between the double steps 3. The fastener 9 includes a cylindrical mounting sleeve extending outwardly from the support member 2 and a circular retaining flange 11 or Versabutton™ positioned on the mounting sleeve opposite the support member 2. The flange 12 is preferably a metal washer or equivalent structure having a diameter significantly greater than the sleeve and including a hole in the center thereof. The sleeve and flange are secured to the support member 2 by a bolt inserted into the support member 2 through the hole in flange and through sleeve. The bolt extends through the support member 2 and is secured to the support member 2 opposite the fastener by a nut. The fastener 10 provides a point on the support member 2 used to removably attach each end of a securing belt to the support member 2 in order to reliably secure the module 1 to the tree.

The belt is comprised of a securing strap, a buckle strap, and a releasable buckle. The securing strap is an elongate strap of a durable material, such as nylon, that includes a free end and a loop integrally formed in the strap opposite the free end. The securing strap is removably attached to the fastener 9 by placing the loop around the retaining flange of fastener. The flange prevents the loop 12 from disengaging from the fastener 9, maintaining the securing strap in attachment, with the support member 2.

The buckle strap is formed of the same material as the securing strap and also includes a loop at one end that is also removably attached to the fastener 9. However, the end of buckle strap opposite the loop is attached to the buckle, which is placed around the tree to receive the free end of securing strap to secure the climbing stick 1 on the tree.

To attach the climbing stick 1 to a selected tree, first, the securing strap and buckle strap are secured to the fastener 9 on support member 2 so that the securing arrangement and, namely, the buckle on buckle strap, will not be obstructed by any limbs extending from the tree. Next, the support bolts 7 are positioned against the center of the tree to position the support member 2 in a generally vertical direction on the tree. Then, the straps and of the securing belt are wrapped around the tree in opposite directions, and the free end of securing strap is inserted through the buckle 13. The securing strap is pulled tight through buckle to securely fasten the securing belt about the tree.

As an alternative to the flange Versabutton™ design 11, the climbing stick 1 of the invention can have attachment anchor 14 fabricated as part of the one-piece design for streamline attachment, as illustrated by FIG. 5. The attachment anchor serves as a wedge for rope attachment opposed to dual cam mechanisms.

The invention also contemplates a lightweight, portable treestand with climbing sticks attached thereto via carrying ports, wherein said treestand comprises a seat member that interlocks to said platform forming a shelf like structure and wherein said climbing sticks comprise stabilizing brackets that pivot allowing them to rest flush with the body or center support structure of said climbing stick.

Various modes of carrying out the present invention are contemplated as being within the scope of the following claims particularly pointing out and distinctly claiming the subject matter which is regarded as the invention.

I claim:

1. A one piece climbing stick configured to be releasably securable to a tree comprising a center support structure and at least two double steps, wherein a first double step is fabricated proximate to the uppermost section of the center support structure and a second double step is fabricated proximate to the lowermost section of said center support structure, wherein said climbing stick is solid metal and is fabricated from a single sheet of aluminum or aluminum alloy stock and wherein said one-piece climbing stick comprises at least two support bolts mounted to said climbing stick which are configured to securely engage a tree when in use.

2. The one-piece climbing stick of claim 1 wherein each double step comprises a left and right step each comprising a stepping surface, wherein said double step is in the same plane of and perpendicular to the center support structure.

3. The one-piece climbing stick of claim 2 wherein the left and right step of said double step is angled from 1 to about 20 degrees upward from the horizontal plane.

4. The one-piece climbing stick of claim 2 wherein said double steps comprise foot grips molded or cut into the stepping surfaces of said double steps allowing for a non-slip stepping surface for the user when climbing.

5. The one-piece climbing stick of claim 1 which comprises two support bolts wherein one support bolt is mounted to the left step of the uppermost double step and one support bolt is mounted to the right step of the uppermost double step.

6. The one-piece climbing stick of claim 5 wherein the length of the support bolts is adjustable and said support bolts are angled outward at an angle of from 1 to 20 degrees from the plane that is perpendicular to the center support structure.

7. The one-piece stick of claim 5 comprising an additional set of support bolts mounted to the lowermost double steps of said one-piece stick wherein a first support bolt is mounted to the left step of the lowermost double step and a second bolt is mounted to the right step of the lowermost double step.

8. The one-piece climbing stick of claim 5 comprising at least two receiving ports or holes proximate to the top and/or bottom double steps of the climbing stick, wherein said receiving ports are configured to receive the support bolts of another stick, allowing two or more sticks to be securely nested together.

9. The one-piece climbing stick of claim 1 which additionally comprises at least one a fastener, wherein said fastener comprises a retaining flange mounted to the center support structure or an attachment anchor that is fabricated as part of the one-piece stick.

10. The one-piece climbing stick of claim 9 wherein said retaining flange is circular and is secured to the center support structure by a bolt inserted through the center of the retaining flange and through the support structure and secured on the opposite side of said support structure by a fastener or a nut.

11. The one-piece stick of claim 9 wherein said circular retaining flange and/or attachment anchor are configured to receive a securing belt to securely attach said stick to a tree, wherein said securing belt is selected from a strap, cable, rope or chain.

12. The one-piece climbing stick of claim 11 wherein said securing belt comprises an adjustable buckle and a pair of straps, cables, ropes or chains, each including a loop at one end, wherein the straps, cables, ropes or chains are placed around a tree and loops placed over the flange or attachment anchors of the to secure the climbing stick to a tree.

13. The one-piece climbing stick of claim 9 wherein said fastener comprises two attachment anchors fabricated on the left and right sides of said center support structure.

14. The one-piece climbing stick of claim 1 which is fabricated from solid aluminum or aluminum alloy stock that is milled, machined, laser cut and/or water jetted.

15. The one-piece climbing stick of claim 1 which additionally comprises a belt fastener disposed on the center support structure of said climbing stick.

16. The one-piece climbing stick of claim 9 wherein said attachment anchor or retaining flange are fabricated as part of the one-piece design.

17. The one-piece climbing stick of claim 5 wherein said support bolts are adjustable and can be lengthened or shortened thereby adjusting the distance said one-piece stick is from the tree.

* * * * *